US012151926B2

(12) United States Patent
Laumer et al.

(10) Patent No.: US 12,151,926 B2
(45) Date of Patent: Nov. 26, 2024

(54) LOCAL SYSTEM FOR CONTAINER TREATMENT

(71) Applicant: KRONES AG, Neutraubling (DE)

(72) Inventors: Roland Laumer, Regensburg (DE); Christina Laumer, Regensburg (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/840,175

(22) Filed: Jun. 14, 2022

(65) Prior Publication Data

US 2022/0396465 A1 Dec. 15, 2022

(30) Foreign Application Priority Data

Jun. 14, 2021 (DE) ......................... 102021115283.6

(51) Int. Cl.
*B67C 7/00* (2006.01)
*B67C 3/00* (2006.01)
*B67C 3/24* (2006.01)

(52) U.S. Cl.
CPC .............. *B67C 7/002* (2013.01); *B67C 3/007* (2013.01); *B67C 3/24* (2013.01); *B67C 7/0073* (2013.01)

(58) Field of Classification Search
CPC ............ B67C 7/002; B67C 3/007; B67C 3/24
USPC ............................................................ 141/29
See application file for complete search history.

(56) References Cited

U.S. PATENT DOCUMENTS 3,845,605 A * 11/1974 Hartness ................. B65B 43/40 53/492
5,450,882 A 9/1995 Cragun
5,587,089 A * 12/1996 Vogel .................... B08B 9/0826 210/764
7,571,586 B1 8/2009 Morales
11,938,523 B2 * 3/2024 Brikmann .............. B25J 21/005
2005/0086909 A1 * 4/2005 Krulitsch ................ B67C 3/004 53/167
2014/0157698 A1 * 6/2014 Cihak .................... A23C 9/156 52/234
2018/0070760 A1 3/2018 Herbert et al.
2020/0249660 A1 * 8/2020 Rao .................... G05B 13/0265

FOREIGN PATENT DOCUMENTS

CN 209168261 U 7/2019
CN 110370252 A 10/2019
CN 110675560 A 1/2020
CN 110997552 A 4/2020
CN 111599090 A 8/2020
CN 212391838 U 1/2021
(Continued)

OTHER PUBLICATIONS

EP3808383A2—English Translation (Year: 2021).*

*Primary Examiner* — Timothy L Maust
*Assistant Examiner* — Christopher M Afful
(74) *Attorney, Agent, or Firm* — Caesar Rivise, PC

(57) ABSTRACT

A system for container processing for setting up in a shop or at a station. The system may have a receiving region, a cleaning device, a filling device, a removal region and a handling device. The system can advantageously be set up or installed directly in a shop, at a station or in the public space in a town square (e.g. marketplace). The system makes it possible for beverages and other products to be able to be decanted locally. The containers here can be cleaned beforehand in order to ensure hygienic filling.

20 Claims, 1 Drawing Sheet

(56) References Cited

FOREIGN PATENT DOCUMENTS

| | | | | |
|---|---|---|---|---|
| DE | 2452704 | A1 | 5/1976 | |
| EP | 3808383 | A2 * | 4/2021 | ............... A61L 2/07 |
| EP | 3815877 | A1 | 5/2021 | |
| GB | 2588189 | | 4/2021 | |
| JP | 2001199410 | A | 7/2001 | |
| WO | WO2018/118659 | | 6/2018 | |

* cited by examiner

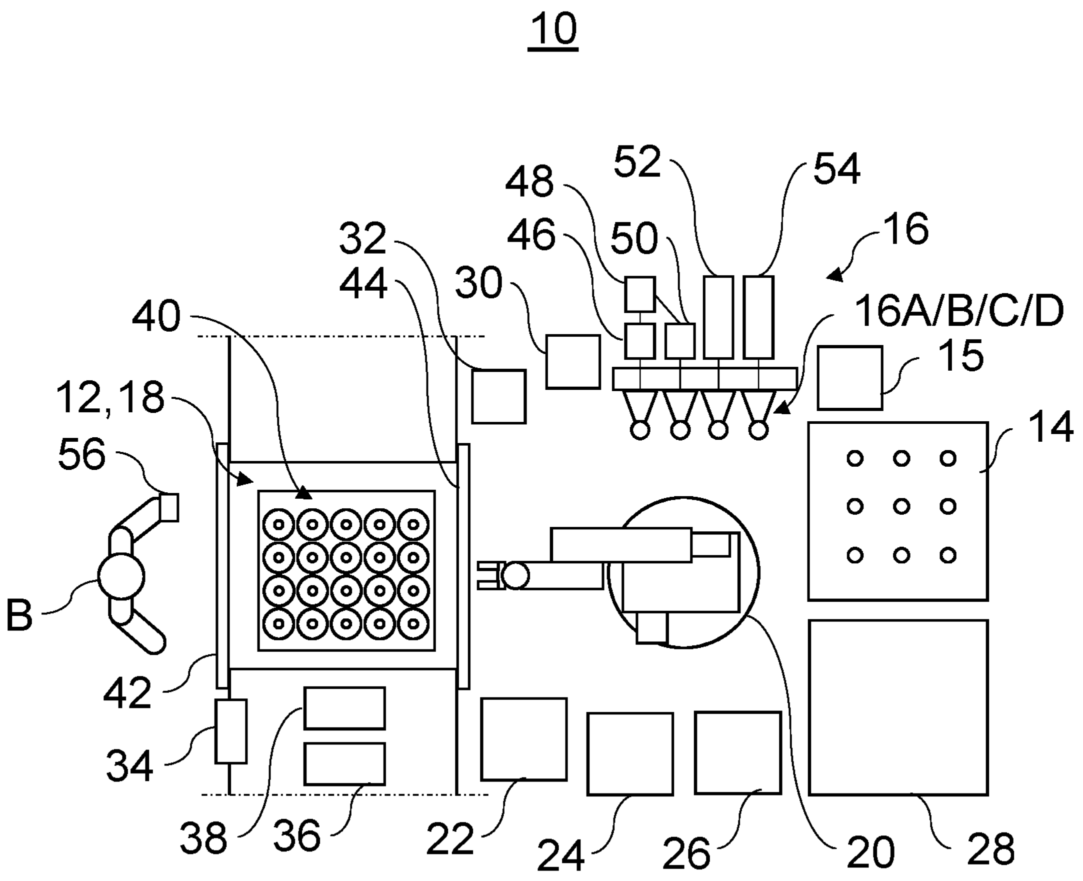
10
52
54
48
16
46
50
32
44
30
16A/B/C/D
40
15
12,18
14
56
B
42
34
38
36
22
24
26
20
28

LOCAL SYSTEM FOR CONTAINER TREATMENT

CROSS-REFERENCE TO RELATED APPLICATIONS

This application claims the benefit under 35 U.S.C. § 119(a) of German Patent Application No. DE 10 2021 115 283.6 filed Jun. 14, 2021 entitled LOCAL SYSTEM FOR CONTAINER PROCESSING, and whose entire disclosure is incorporated by reference herein.

TECHNICAL FIELD

The invention relates to a system for container processing and to a method for operating a system for container processing, wherein the system is suitable for setting up locally in a shop or at a station.

TECHNICAL BACKGROUND

Beverages and other liquid or pasty products are produced in large factories and packaged in small packages, for example consisting of a plurality of individual containers (primary packaging). These packages are in turn combined by secondary packaging to form larger packages. The larger packages are subsequently transported to the retail sector, generally by lorry, and sometimes with a detour via wholesale.

Primary and secondary packaging use either disposable or reusable containers. Disposable packaging is only partially recycled, with the remainder being incinerated or dumped—with corresponding environmental damage and destruction of valuable resources. All packaging has to be transported by the packaging manufacturer to the filler, from the beverage filler to wholesale and from wholesale to the retail sector. Reusable containers pass back again along the same path. Disposable packaging has to be transported by the retailer or consumer to the recycling facility or to landfill or for waste incineration. In addition, the packaging in small packages requires substantially more packaging material than in large packages since little volume is surrounded by a large surface area.

WO 2018/118659 A1 discloses a method for dispensing a product using a consumer-refillable packaging in a retail environment. The method comprises the production of a liquid product at a production location. The liquid product is then transported in a refillable canister to a retail location the canister being mounted in a storage room as part of a delivery subsystem for transferring the liquid product from the storage room to a refill station in a retail space. Consumers operate the refill station in order to refill a refillable container with the liquid product from the canister in the storage room via the refill station.

The invention may be beneficial in providing technology for supplying consumers with beverages and/or other products, which is environmentally friendly and produces less packaging waste.

SUMMARY OF THE INVENTION

Benefits may be achieved by the features of independent claim 1. Advantageous developments are specified in the dependent claims and the description.

One aspect relates to a (e.g. small and/or local) system for container processing for setting up in a shop (e.g. retail environment or wholesale environment) or at a station. The system has a receiving region, in which at least one container can be positioned manually by a user. The system has a cleaning device for cleaning the interior of the at least one container. The system has a filling device for filling the at least one container. The system has a removal region, from which the at least one container after processing (e.g. cleaning and filling) in the system can be removed manually by the user. The system has a handling device which is designed for transporting containers (e.g. by individual handling of individual containers or a plurality of containers) between the receiving region, the cleaning device, the filling device and the removal region.

The system can advantageously be set up or installed directly in a shop, at a station (for example, bus station or train station) or in a public space in a town square (e.g. marketplace). The system makes it possible for beverages and other products to be able to be decanted locally. The containers here can be cleaned beforehand in order to ensure hygienic decanting. The containers are advantageously multiuse containers, e.g. glass or metal bottles (or also canisters, cartons, flasks, etc.). The system can afford the advantage of packaging being able to be more frequently reused and of shorter transport distances being covered. Primary packaging (=container) is transported only by the consumer to the sale point and back. Secondary packaging can be reduced: for example, there are just reusable boxes, and the use of film is dispensed with. For transport from the manufacturer to the sale point (=system), it is possible, for example, only for large packages (containers) to be used. With the same contents, these have less weight than individual containers and take up less space. Therefore, more product can be transported in a lorry, for example. Overall, as a result, for example less CO2 can be emitted and resources protected.

In one exemplary embodiment, the receiving region and the removal region are designed as an integrated unit. A space-saving solution for receiving and dispensing the containers can therefore advantageously be provided.

In a further exemplary embodiment, the receiving region and/or the removal region are/is embodied as a (e.g. monitored) lock which preferably restricts access to the system (e.g. to the cleaning device, to the filling device and/or to the handling device). Advantageously, unauthorized access to the system can therefore be prevented and thus, for example, a risk of injury to the user can be reduced.

In a further exemplary embodiment, in the receiving region simultaneously (or at one time) a plurality of containers can be positioned manually by the user in a package, preferably a box. Alternatively or additionally, from the removal region simultaneously (or at one time) a plurality of containers can be removed manually by the user in a package, preferably a box. Therefore, advantageously, the system efficiency can be increased and, for example, a genuine alternative to a conventional shop selling beverages or a conventional beverage department in a supermarket created.

In a further exemplary embodiment, the handling device has at least one, preferably multiaxial, robot, preferably articulated robot, gantry robot and/or delta robot (or is designed as such). Alternatively or additionally, the handling device connects the receiving region, the cleaning device, the filling device and the removal region flexibly to one another (e.g. adaptably, changeably or programmably in terms of control technology). Alternatively or additionally, the receiving region, the cleaning device, the filling device and/or the removal region are arranged distributed around the handling device, preferably in a star-shaped manner. A particularly space-saving system can therefore be advantageously created. Preferably, the container transport can be designed to be highly flexible. While, for example, some containers are cleaned in the cleaning device, the handling device can transport other containers away from the filling device or out of the receiving region. The handling device can preferably handle containers always precisely at the location where container transport is specifically required.

For example, the handling device can be arranged substantially centrally in the system.

In one embodiment, the filling device has a plurality of filling stations for differently filling the at least one container. Advantageously, it is therefore also possible to fill up with different products.

In a further embodiment, the plurality of filling stations are at least partially connected or connectable to differently filled large packages. Alternatively or additionally, at least one of the plurality of filling stations is connected to a blending system, a reverse osmosis system, a softener, a remineralization system, a carbonator and/or a drinking water connection of the system. Alternatively or additionally, at least one of the plurality of filling stations is designed as an aseptic filling station for aseptic decanting. Alternatively or additionally, at least one of the plurality of filling stations is designed for mixing a plurality of products during decanting.

In a further embodiment, the system furthermore has a closure release device for releasing a closure, preferably screw cap, from the at least one container. Alternatively or additionally, the system has a closing device for closing the at least one container, preferably with a screw cap. Alternatively or additionally, the system has a closure cleaning device for cleaning a closure of the at least one container. For example, the closure cleaning device can be integrated with the cleaning device or formed separately therefrom.

In a further embodiment, the system furthermore has a buffer region, in which the at least one container can be temporarily stored. Advantageously, therefore, for example containers which are already filled can be temporarily stored until the operator appears to retrieve them. The containers therefore, for example, do not block the removal region and optionally the receiving region.

In a further embodiment, the system furthermore has an unpacking and/or packaging station, at which a plurality of containers can be removed from a package, preferably box, and/or can be positioned in a package, preferably box, preferably via the handling device or a robot, preferably SCARA robot, of the unpacking and/or packaging station.

In one embodiment variant, the system furthermore has an inspection device, which is designed to check the containers for damage and/or soiling, preferably visually, chemically and/or via mass spectrometers. Containers with damage or soiling which can no longer be cleaned can therefore be advantageously segregated out.

In a further embodiment variant, the system can furthermore have a labelling and/or printing device, which is designed to provide the containers, depending on a filling medium in the respective container that the filling device has filled into the respective container, with a use by date and/or information regarding the filling medium.

In one exemplary embodiment, the system furthermore has a communication interface for (e.g. directly, indirectly and/or wirelessly) communicating with a mobile terminal (e.g. tablet, smartphone, etc.). Advantageously, the system can therefore be controlled via the mobile terminal and an app installed thereon, for example. The transmission can take place, for example, from home via the Internet or directly in situ at the system via wireless communication with the system (e.g. WLAN, Bluetooth, NFC, etc.).

In one exemplary embodiment, the communication interface is configured to receive, from the mobile terminal (and e.g. to transmit to a control unit of the system), order information for filling at least one predetermined container with a specified filling medium. Via an app, for example at home, a selection can be made regarding products to be filled.

In a further exemplary embodiment, the communication interface is configured to send, to the mobile terminal, retrieval information for retrieving at least one predetermined container from the removal region. Advantageously, the user can therefore be informed about when they can retrieve the filled containers from the system.

In a further exemplary embodiment, the communication interface is configured to send, to the mobile terminal, status information regarding the current processing status of at least one predetermined container. Advantageously, the user can therefore be informed as to how long the processing will still last.

In a further exemplary embodiment, the communication interface is configured to receive, from the mobile terminal, and/or to send, to the mobile terminal, billing information for billing processing of at least one predetermined container. Payment by app, for example, can therefore preferably be made possible.

In a further exemplary embodiment, the communication interface is configured to send, to the mobile terminal, information regarding available filling media of the filling device, regarding an estimated container processing duration, regarding a price for the container processing, regarding compatible containers and/or regarding an occupancy state of the system.

In one embodiment, the system furthermore has a user interface via which order information for filling at least one predetermined container with a specified filling medium can be input by the user.

Alternatively or additionally, via the user interface, information regarding available filling media of the filling device, regarding an estimated container processing duration, regarding a price for the container processing, regarding compatible containers and/or regarding an occupancy state of the system can be output. Alternatively or additionally, the user interface is designed for receiving cash, for cashless payment and/or for issuing a (e.g. digital or printed) receipt.

In one exemplary embodiment, the system has a total footprint of ≤100 sqm, ≤80 sqm, ≤60 sqm, ≤50 sqm, ≤40 sqm, ≤30 sqm, ≤20 sqm, ≤15 sqm or ≤10 sqm. Advantageously, a comparatively small system can therefore be created for installation in a shop, at a station, etc.

It is possible for the unpacking and/or packaging device, the inspection device, the closure release device, the closure cleaning device, the buffer region, the closing device and/or the labelling and/or printing device to be arranged (e.g. likewise) distributed around the handling device.

It is also possible for the handling device for transporting containers (e.g. via individual handling of individual containers or a plurality of containers) to be formed between the unpacking and/or packaging device, the inspection device, the closure release device, the closure cleaning device, the buffer region, the closing device and/or the labelling and/or printing device.

A further aspect relates to a method for operating a system as herein disclosed, preferably in a shop or at a station. The method comprises manually positioning at least one container in the receiving region by the user, transporting the at least one container through the system via the handling device, and cleaning the at least one container via the cleaning device. The method furthermore comprises filling the at least one (e.g. cleaned) container via the filling device (e.g. with drinking water, milk, juice, a soft drink, a spritzer, beer, wine, cleaning agents or care products) and providing the at least one (e.g. cleaned and filled) container in the removal region for manual removal.

For example, the method can furthermore comprise unpacking the at least one container from a package, preferably a box, via the unpacking device. The method can optionally comprise releasing a closure from the at least one container via the closure release device. The method can preferably comprise checking the at least one container via the inspection device. The method can preferably comprise cleaning the released closure via a closure cleaning device or the cleaning device. The method can furthermore comprise, for example, closing the at least one container, preferably with the cleaned closure, via the closing device. The method can optionally furthermore comprise packaging the at least one container in a package, preferably box, via the packaging device. The method can furthermore preferably comprise temporarily storing the at least one container in the buffer region.

The term "control unit" can preferably refer to electronics (e.g. with a microprocessor/microprocessors and a data store) which, depending on the design, can take on control tasks and/or regulating tasks and/or processing tasks. Even if the term "controlling" is used here, "regulating" or "controlling with feedback" and/or "processing" can expediently also as it were be covered or meant by it.

The previously described preferred embodiments and features of the invention can be combined with one another as desired.

BRIEF DESCRIPTION OF THE FIGURE

Further details and advantages of the invention will be described below with reference to the attached drawing, in which:

FIG. 1 shows a schematic top view of a (small) system for container processing according to an exemplary embodiment of the present disclosure.

DETAILED DESCRIPTION OF EXEMPLARY EMBODIMENTS

FIG. 1 shows a container processing system 10. The system 10 is configured as a small system or local system. For example, the system 10 has a total footprint which is ≤100 sqm, ≤80 sqm, ≤60 sqm, ≤50 sqm, ≤40 sqm, ≤30 sqm, ≤20 sqm, ≤15 sqm or ≤10 sqm. The system 10 can preferably be set up or used in a shop (e.g. supermarket, discount store, shop selling beverages, retail business, wholesale business, shopping centre, etc.). Alternatively, the system 10 can be set up and used, for example, at a station or in the public space in a town square. The system 10 can be accommodated, for example, in a closable room which is not accessible to a user B of the system 10 or is accessible only for technical and service staff (e.g. is key-secured).

The system 10 has a receiving region 12, a cleaning device 14, a filling device 16, a removal region 18 and a handling device 20. The system 10 can furthermore have an unpacking and/or packaging station 22, a closure release device 24, an inspection device 26, a buffer region 28, a closing device 30 and/or a labelling and/or printing device 32. The system 10 can furthermore have a user interface 34, a communication interface 36 and/or a control unit 38.

The receiving region 12 is designed for receiving containers 40 from a user B. The user B can position the containers 40 themselves in the receiving region 12. Containers 40 positioned in the receiving region 12 can preferably be transported away by the handling device 20.

The containers 40 are preferably reusable containers. The containers 40 can be predetermined for the use in the system 10. The containers 40 are preferably glass containers (e.g. glass bottles) or metal containers (e.g. metal bottles), preferably for hygiene reasons, for the decanting of foodstuffs or beverages. However, it is also possible for the containers 40 to be, for example, plastics containers, preferably for the decanting of cleaning agents or care products or health care products. In order to use the system 10, the user B can bring the containers 40 themselves or, for example, acquire them in situ at the system 10.

For example, the containers 40 can be placed into the receiving region 12 individually, several at a time or in at least one package (e.g. crate). It is also possible for the receiving region 12 to be divided into a plurality of subregions. One subregion can be designed for receiving individual containers 40. A further subregion can be designed for receiving at least one package containing a plurality of containers 40.

The receiving region 12 can have a stationary depositing surface for the containers 40. Alternatively, the depositing surface can be, for example, movable, e.g. in the form of a plate conveyor or belt conveyor. The containers 40 can be transported on the movable depositing surface, for example in the direction of the handling device 20 and/or in an opposed manner thereto.

The receiving region 12 can separate the user B from the system 10. The receiving region 12 can be designed as a lock. The lock can have, for example, at least one lock door 42, 44.

In a closed position, the lock door 42 can block access to the receiving region 12 from outside the system 10. In an open position, the lock door 42 can open up access to the receiving region 12 from outside the system 10.

In a closed position, the lock door 44 can block access to the receiving region 12 from inside the system 10 and/or for the handling device 20. In an open position, the lock door 44 can open up access to the receiving region 12 from inside the system 10 and/or for the handling device 20.

The lock door 42 and/or 44 can be movable, e.g. displaceable and/or pivotable, between the closed position and the open position. The lock door 42 and/or 44 can be movable, for example, via a drive, preferably an electric drive.

It is possible that, during normal operation of the system 10, the lock doors 42, 44 are controlled by the control unit 38 in such a manner that a maximum of one of the two lock doors 42, 44 is opened at the same time.

It is also possible for the receiving region 12 to be monitored, e.g. via a camera, an LED scanner or a laser scanner. If an impermissible movement or an impermissible penetration into the receiving region 12 is detected, the control unit 38, for example, can prevent opening of the lock door 44, can bring about closing of the lock door 44 and/or can shut down the handling device 20 or transfer same into a secure state.

It is likewise possible for the receiving region 12 and the removal region 18 to be designed as a common receiving/removal region, as illustrated in FIG. 1. Alternatively, the receiving region 12 and the removal region 18 can be formed separately from each other, for example.

The cleaning device 14 is designed to clean containers 40 from the inside. The cleaning device 14 can receive the containers 40 from the handling device 20. After the cleaning, the handling device 20 can transport away the cleaned containers 40.

The cleaning device 14 can clean and/or sterilize the containers 40 with a cleaning fluid, e.g. water, optionally containing a cleaning additive (e.g. lye). The cleaning device 14 can, for example, rinse out the containers 40. For example, the cleaning device 14 can have a plurality of liquid nozzles from which a cleaning fluid can be sprayed into the containers 40. The containers 40 can be positioned and/or oriented in the cleaning device 14 in such a manner that the liquid nozzles aim at container openings of the containers 40.

For example, the cleaning device 14 can clean the containers 40 upside down. The containers 40 can be transferred, for example, by the handling device 20 upside down to the cleaning device 14.

The cleaning device 14 can clean the containers 40 when stationary. Alternatively, during the cleaning in the cleaning device 14, the containers 40 can be conveyed, for example, from an inlet of the cleaning device 14 to an outlet of the cleaning device 14, preferably via a driven conveyor. The containers 40 can be taken over or delivered at the inlet by the handling device 20. The containers 40 can be taken over or transported away at the outlet by the handling device 20.

The filling device 16 is designed for filling the containers 40. The filling device 16 is preferably designed as a linear filler. Alternatively, the filling device 16 can be designed, for example, as a filler carousel. The filling device 16 can receive the (cleaned) containers 40 from the handling device 20. The filled containers 40 can be transported away by the handling device 20.

The filling device 16 can have a plurality of filling stations 16A-16D for filling the containers 40 with different products or filling media. Depending on the configuration, drinking water (mineral water), at least one juice, at least one spritzer, at least one lemonade, at least one soft drink, at least one milk, at least one wine, at least one beer, at least one (body) care product and/or at least one cleaning product can be decanted by at least one of the filling stations 16A-16D.

It is possible for at least one of the filling stations 16A-16D to be designed for aseptic decanting, e.g. in order to decant milk into the containers 40. The milk can be, for example, pasteurized beforehand in a dairy and connected to the corresponding filling station in a reusable large package.

For example, at least one juice, one spritzer and/or one soft drink can be decanted with the filling station 16A. The filling station 16A can be connected, for example, to a blending system 46 and to a reverse osmosis system 48. Preferably pasteurized juice concentrate can be connected in a reusable large package to the blending system 46. The reverse osmosis system 48 can be connected to a drinking water connection and can process the drinking water in order to provide reverse osmosis water. In the blending system 46, the desired beverage can be blended with reverse osmosis water from the reverse osmosis system 48 and optionally carbonated. Alternatively, the blending can take place, for example, in the filling valve of the filling station 16A. The blended beverage can be decanted, preferably aseptically, into a container 40 with the filling station 16A.

For example, at least one drinking water can be decanted with the filling station 16B. The filling station 16B can be connected, for example, to the reverse osmosis system 48 and a remineralization system 50 (e.g. with a mineral metering station, dolomite filter). There may optionally also be a softener system, for example. Reverse osmosis water can be provided with the reverse osmosis system 48. The remineralization system 50 can remineralize the reverse osmosis water as desired in order to produce mineral waters such that, for example, a "reproduction" of mineral waters is made possible in situ in the system 10. If desired, the drinking water can optionally be carbonated. Alternatively, the drinking water can be made available, for example, in a reusable large package by the manufacturer and connected to the filling station 16B.

For example, beverages, such as, for example, beer or wine, etc., can be decanted with the filling station 16C. Beer can be filled, for example, by a brewery into a reusable large package 52 (e.g. keg or container—depending on sales volumes; only illustrated purely schematically and in reduced size in FIG. 1). Wine can be filled, for example, by a winemaker into a reusable large package 52 (e.g. keg, container—depending on sales volumes). The large package 52 can be connected to the filling station 16C. The product contained in the connected large package 52 can be decanted, preferably aseptically, into a container 40 with the filling station 16C.

With the filling station 16D, for example, a cleaning agent (e.g. detergent, vinegar-based cleaner, etc.) or a care product or health care product (e.g. liquid soap, shampoo, etc.) can be decanted. The cleaning agent or the care product can be filled, for example by the manufacturer, into a large package 54 (only illustrated purely schematically and in reduced size in FIG. 1). The large package 54 can be connected to the filling station 16D.

The large package 52 and/or 54 can have, for example, a volume of at least 10 litres, preferably at least 30 litres or at least 50 litres. A large package 52 and/or 54 can also have a volume of 1 $m^3$ with products already blended.

It is possible for the filling stations 16A-16D to be able to be cleaned via self-cleaning (e.g. via a cleaning-in-place (CIP) system). The cleaning can take place automatically, for example, in predeterminable time intervals, after a predetermined number of filling cycles, at the beginning of operation of the system 10 and/or at the end of operation of the system 10. In order to control the cleaning, it is optionally possible to apply product categories which can be filled by the same filling valve of the filling stations 16A-16D. For example, it is possible to create a matrix as to which cleaning (none, only water, lye, acid, . . . ) is necessary if a certain product follows a certain other product at the same filling station 16A-16D.

The removal region 18 is designed for providing the (cleaned and filled) containers 40. The removal region 18 can receive the containers 40 from the handling device 20. For example, the containers 40 can be provided in the removal region 18 individually, several at a time or in at least one package (e.g. crate).

It is also possible for the removal region 18 to be divided into a plurality of subregions. One subregion can be designed for providing individual containers 40. A further subregion can be designed for providing at least one package containing a plurality of containers 40.

The removal region 18 can have a stationary depositing surface for the containers 40. Alternatively, the depositing surface can be, for example, movable, e.g. in the form of a plate conveyor or belt conveyor. The containers 40 can be transported on the movable depositing surface, for example, in the direction of the handling device 20 and/or in the opposite direction thereto.

The removal region 18 can separate the user B from the system 10. The removal region 18 can be designed as a lock, corresponding to the explanations for designing the receiving region 12 as a lock. For example, the removal region 18 can have at least one lock door 42, 44 etc.

The handling device 20 can connect the devices or regions 12, 14, 16, 18, 22, 24, 26, 28, 30 and/or 32 to one another in order to transport containers between said devices or regions, 12, 14, 16, 18, 22, 24, 26, 28, 30 and/or 32, preferably by individual handling (i.e. not a flowing process).

The handling device 20 preferably has at least one, preferably multiaxial, robot or is designed as at least one robot. The at least one robot can comprise, for example, an articulated robot, a gantry robot and/or a delta robot. It is also possible for the handling device 20 to have at least one container conveyor.

The handling device 20 can be arranged substantially centrally in the system 10. The devices or regions 12, 14, 16, 18, 22, 24, 26, 28, 30 and/or 32 are preferably arranged distributed around the handling device 20, preferably in a star-shaped manner. The handling device 20 can be arranged in such a manner that it can reach the devices or regions 12, 14, 16, 18, 22, 24, 26, 28, 30 and/or 32.

It is possible for the handling device 20 to be able to turn the containers 40 upside down and back. For empale, the handling device 20 can turn the containers 40 upside down before they are transferred to the cleaning device 14. Alternatively or additionally, the handling device 20 can turn containers 40, which are oriented upside down, from the cleaning device 14 back again into an upright orientation. Alternatively, for example, the cleaning device 14 can be designed for turning the containers 40 upside down and/or for turning them back.

The unpacking and/or packaging station 22 is designed to unpack or to remove containers 40 from a package (e.g. box) and/or to pack or to position containers 40 in a package (e.g. box). For this purpose, the station 22 can have, for example, a dedicated robot device, e.g. a SCARA robot. Alternatively or additionally, the station 22 can be operated, for example, by the handling device 20.

For example, the station 22 can receive the containers 40 from the handling device 20. After the unpacking in the station 22, the handling device 20 can transport the containers 40, for example, to the closure release device 24, the inspection device 26 or to the cleaning device 14. After the packaging in the station 22, the handling device 20 can transport the packages containing the containers 40 to the removal region 18, for example.

The unpacking and/or packaging station 22 can be designed as an integrated unit for unpacking and packaging. Alternatively, the unpacking and/or packaging station 22 can be designed, for example, as two separate units. The separate units can also be spatially separated, for example. The unit for unpacking can be arranged, for example, directly adjacent to the receiving region 12. The unit for packaging can be arranged, for example, directly adjacent to the removal region 18.

The closure release device 24 is designed to release the closures from the containers 40. The closure release device 24 can receive the containers 40 from the handling device 20.

For example, the closure release device 24 can twist off twist caps or screw caps from the containers 40. The released closures can either be disposed of (disposable closures) or preferably cleaned (reusable closures), for example in the cleaning device 14 or in a separate cleaning device 15 for the closures. It is also possible for the closures to be sterilized. After the cleaning and optionally sterilizing, the closures of the closing device 30 can be supplied for closing the containers 40, e.g. via the handling device 20.

Alternatively to the arrangement of the closure release device 24, for example it may also be required and optionally checked that the containers 40 are positioned by the user B without a closure in the receiving region 12.

The inspection device 26 is designed to check the containers 40 for damage and/or soiling. The check can be undertaken, for example, visually, chemically and/or via mass spectrometers. For the check, the inspection device 26 can receive the containers 40 from the handling device 20, for example.

Alternatively, the handling device 20 can, for example, guide the containers 40 past the inspection device 26 for checking.

The buffer region 28 is designed for temporarily storing containers 40. The buffer region 28 can receive containers 40 from the handling device 20. The handling device 20 can transport containers 40 away from the buffer region 28. The buffer region 28 can be arranged at a suitable position in the system 10, e.g. at a location where bottlenecks may occur or for example, adjacent to the removal region 18 and/or to the receiving region 12.

The buffer region 28 can have a stationary depositing surface for the containers 40. Alternatively, the depositing surface of the buffer region 28 can be, for example, movable, for example in the form of a plate conveyor or belt conveyor. The containers 40 can be transported on the movable depositing surface, for example, in the direction of the handling device 20 and/or in the opposite direction thereto.

The closing device 30 is designed for closing the containers 40, e.g. with a cover, a cork, a crown cap or a screw cap. The closing device 30 can be designed, for example, as a closer carousel or a linear closer. The closing device 30 can have a plurality of closing stations for simultaneously closing a plurality of containers 40. The closing device 30 can receive the containers 40 from the handling device 20. The handling device 20 can transport the (closed) containers 40 away from the closing device 30.

The labelling and/or printing device 32 is designed to label and/or to print the containers 40. For example, the device 32 can provide a container 40, depending on a filling medium in the container 40 that the filling device 16 has filled into the container 40, with a best before date and/or information regarding the filling medium. The date and/or the information can be, for example, contained or printed, for example with an alkali-soluble ink, on a label which can be stuck on.

As illustrated in FIG. 1, the devices or regions 12, 14, 16, 18, 20, 22, 24, 26, 28, 30 can be designed as separate units. However, it is also possible for a plurality of units to be integrated with one another. For example, the filling device 16 and the closing device 30 can be integrated with each other in one unit.

The user interface 34 is designed for outputting information to the user B and/or for inputting input commands by the user B. For example, the information can be output visually and/or acoustically to the user B. The user interface 34 can preferably have a, preferably touch-sensitive, display device. Alternatively or additionally, the user interface 34 can have, for example, at least one button, at least one switch and/or a microphone, etc., for inputting the input commands. The user interface 34 is preferably arranged adjacent to the receiving region 12.

The input information can preferably comprise order information for predetermined containers 40 of the user B for filling the predetermined containers 40 with a desired specified filling medium via the filling device 16. The order information can be transmitted to the control unit 38 for the corresponding control of the system 10.

The output information can preferably comprise, for example, information regarding available filling media of the filling device 16, information regarding an estimated processing duration by the system 10, price information for processing the containers 40, compatibility information with regard to compatible containers 40 and/or information regarding an occupancy state of the system 10 etc.

It is possible for the user interface 34 to be designed for receiving payment for processing of the containers 40. For example, the user B can pay for the container processing with cash and/or without cash (e.g. by card and/or mobile terminal 56) at the user interface 34. It is also possible for the user interface 34 to output a receipt for the user B. The user B can pay for the container processing with the receipt at a separate checkout.

The communication interface 36 is designed for communicating with a mobile terminal 56 of the user B. The communication can take place directly between the communication interface 36 and the mobile terminal, e.g. via WLAN, Bluetooth and/or NFC. Alternatively or additionally, the communication can take place indirectly between the communication interface 36 and the mobile terminal 56, e.g. via the Internet. For example, an application, e.g. an app, permitting communication with the communication interface 36 is installed on the mobile terminal 56.

Via the communication interface 36, for example, order information regarding the filling of predetermined containers 40 with a desired specified filling medium via the filling device 16 can be received from the mobile terminal 56. The order information can be transmitted to the control unit 38 for the corresponding control of the system 10.

Via the communication interface 36, for example, retrieval information for retrieving at least one predetermined container 40 from the removal region 18 can be sent to the mobile terminal 56. It is also possible to send status information regarding the current processing status of at least one predetermined container 40 to the mobile terminal 56. Alternatively or additionally, for example, billing information for billing processing of at least one predetermined container 40 can be received by the mobile terminal 56 and/or can be sent to the mobile terminal 56.

Comparably to the user interface 34, at least one item of information regarding available filling media of the filling device 16, regarding an estimated container processing duration, regarding a price for the container processing, regarding compatible containers 40 and/or regarding an occupancy state of the system 10 can also be sent by the communication interface 36 to the mobile terminal 56.

The control unit 38 is designed for controlling the system 10. In order to control the system 10, the control unit 38 can be connected in terms of signalling, for example, to the receiving region 12, the cleaning device 14, the filling device 16, the filling stations A16A-16D, the removal region 18, the handling device 20, the unpacking and/or packaging station 22, the closure release device 24, the inspection device 26, the buffer region 28, the closing device 30, the labelling and/or printing device 32, the user interface 34, the communication interface 36, the lock door 42, the lock door 44, the blending system 46, the reverse osmosis system 48, the remineralization system 50, the softener and/or the carbonator.

It is possible for container identification to be carried out in the receiving region 12 or at another location in the system 10. The container identification can comprise identifying a shape of the respective container 40 and/or identifying a code (e.g. QR code, RFID, etc.) on the respective container 40. Alternatively or additionally, the container identification can take place on the basis of an input of the user B, e.g. an input at the user interface 34, and/or sent from the mobile terminal 56 and received by the communication interface 36.

On the basis of identification of a container 40, the control unit 38 can control, for example, one or more of the devices or regions 14-32 in order to interact as desired or as specified with the respective container 40. For example, the filling device 16 can be controlled in such a manner that the identified container 40 is always filled with the same filling medium and/or is filled with a filling quantity or filling height predetermined for the identified container 40. For example, it is possible to prevent no foodstuffs, such as beverages, being filled into identified containers intended for cleaning agents or care products. For example, the cleaning device 14 can be controlled in such a manner that a cleaning program predetermined for the identified container 40 is executed during the cleaning of the identified container 40. For example, the handling device 20 can be controlled in such a manner that the identified container 40 is kept in a region predetermined for the identified container 40. For example, the closing device 30 can be controlled in such a manner that a closure predetermined for the identified container 40 is attached to the identified container 40 and/or that a closure is attached at a position predetermined for the identified container 40. For example, the closure release device 24 can be controlled in such a manner that a closure is released from the identified container 40 at a position predetermined for the identified container 40.

The invention is not restricted to the preferred exemplary embodiments described above. Rather, numerous variants and modifications are possible which likewise make use of the concept of the invention and which therefore fall within the scope of protection. In particular, the invention also claims protection for the subject matter and the features of the dependent claims independently of the back-referenced claims. In particular, the individual features of independent claim 1 are disclosed in each case independently of one another. Additionally, the features of the dependent claims are also disclosed independently of all of the features of independent claim 1 and, for example, independently of the features regarding the presence and/or the configuration of the receiving region, the cleaning device, the filling device, the removal region and/or the handling device of independent claim 1. All ranges stated herein are to be understood as being disclosed such that, as it were, all values falling within the respective range are individually disclosed, for example also as respectively preferred narrower outer boundaries of the respective range.

LIST OF REFERENCE SIGNS

10 System
12 Receiving region
14 Cleaning device
16 Filling device
16A-16D Filling station
18 Removal region
20 Handling device
22 Unpacking and/or packaging station
24 Closure release device 26 Inspection device
28 Buffer region
30 Closing device
32 Labelling, encoding and/or printing device
34 User interface
36 Communication interface
38 Control unit
40 Container
42 Lock door
44 Lock door
46 Blending system
48 Reverse osmosis system
50 Remineralization system
52 Large package
54 Large package
56 Mobile terminal

What is claimed is:

1. A system for container processing, comprising:
a receiving region configured to receive a plurality of containers positioned manually by a user;
a cleaning device for cleaning the interior of the plurality of containers;
a filling device for filling the at least one container;
a removal region configured for removal of the at least one container after processing in the system manually by the user; and
a handling device, which is designed for transporting containers between the receiving region, the cleaning device, the filling device and the removal region;
an unpacking and/or packaging station, at which the plurality of containers is configured to be at least one of removed from the package and positioned in the package via one of the handling device and a robot of the unpacking and/or packaging station;
and at least one of:
the receiving region is configured to simultaneously receive the plurality of the containers in a package positioned manually by the user (B); and
the removal region is configured for simultaneous removal of the plurality of the containers in the package manually by the user (B).

2. The system according to claim 1, wherein at least one of:
the receiving region and the removal region are designed as an integrated unit; and
one of the receiving region and the removal region is embodied as a lock that restricts access to the system.

3. The system according to claim 1, wherein the filling device has a plurality of filling stations for differently filling the the containers.

4. The system according to claim 1, wherein the package is a box.

5. The system according to claim 1, wherein at least one of:
the handling device has at least one robot;
the handling device connects the receiving region, the cleaning device, the filling device and the removal region flexibly to one another; and
the receiving region, the cleaning device, the filling device and the removal region are arranged distributed around the handling device.

6. The system according to claim 5, wherein the robot is at least one of a multiaxial robot, an articulated robot, a gantry robot and a delta robot, and the receiving region, the cleaning device, the filling device and the removal region are arranged distributed around the handling device in a star-shaped manner.

7. The system according to claim 1, wherein at least one of:
the plurality of filling stations are at least partially connected or connectable to differently filled large packages;
at least one of the plurality of filling stations is connected to one of a blending system, a reverse osmosis system, a softener, a remineralization system, a carbonator and a drinking water connection of the system;
at least one of the plurality of filling stations is designed as an aseptic filling station for aseptic decanting; and
at least one of the plurality of filling stations is designed for mixing a plurality of products during decanting.

8. The system according to claim 1, furthermore having:
a closure release device for releasing a closure from one of the plurality of containers;
a closing device for closing the one of the plurality of containers; and
a closure cleaning device for cleaning the closure of the one of the plurality of containers.

9. The system according to claim 8, wherein the closure is a screw cap closure, and the closing device is configured to close the one of the plurality of containers with the screw cap closure.

10. The system according to claim 1, furthermore having:
a buffer region in which the plurality of containers is temporarily stored.

11. The system according to claim 1, wherein
the plurality of containers is configured to be both removed from the package and positioned in the package via the one of the handling device and the robot of the unpacking and/or packaging station.

12. The system of claim 1, wherein the package is a box and the robot is a SCARA robot.

13. The system according to claim 1, furthermore having:
an inspection device designed to check the containers for damage and soiling.

14. The system of claim 13, wherein the soiling is visual, chemical or checked via a mass spectrometer.

15. The system according to claim 1, furthermore having:
one of a labelling device and a printing device designed to provide the containers, depending on a filling medium in the respective container that the filling device has filled into the respective container, with a use by date and information regarding the filling medium.

16. The system according to claim 1, furthermore having:
a communication interface for communicating with a mobile terminal, wherein the communication interface is configured at least one of:
to receive, from the mobile terminal, order information for filling at least one predetermined container with a specified filling medium;
to send, to the mobile terminal, retrieval information for retrieving at least one predetermined container from the removal region;
to send, to the mobile terminal, status information regarding the current processing status of at least one predetermined container;
to communicate with the mobile terminal billing information for billing processing of at least one predetermined container; and
to send, to the mobile terminal, information regarding available filling media of the filling device, regarding an estimated container processing duration, regarding a price for the container processing, regarding compatible containers and regarding an occupancy state of the system.

17. The system according to claim 1, furthermore having:

a user interface, at least one of:

via which order information for filling at least one predetermined container with a specified filling medium can be input by the user;

via which information regarding available filling media of the filling device, regarding an estimated container processing duration, regarding a price for the container processing, regarding compatible containers and regarding an occupancy state of the system can be output; and which is designed for at least one of receiving cash, for cashless payment and for issuing a receipt.

18. The system according to claim 1, wherein:

the system has a total footprint of at most 100 sqm.

19. A method for operating the system according to claim 1, wherein the method comprises:

manually positioning the plurality of containers in the receiving region by the user;

transporting the plurality of containers through the system via the handling device;

cleaning the plurality of containers via the cleaning device;

filling the plurality of containers via the filling device; and providing the plurality of containers in the removal region for manual removal.

20. The system according to claim 1, further including a communication interface for communicating with a mobile terminal, wherein the communication interface is configured to send to the mobile terminal at least one of:

retrieval information for retrieving at least one predetermined container from the removal region;

status information regarding the current processing status of at least one predetermined container; and information regarding available filling media of the filling device, regarding an estimated container processing duration, regarding a price for the container processing, regarding compatible containers and regarding an occupancy state of the system.

* * * * *